(12) United States Patent
Riska

(10) Patent No.: US 7,783,142 B2
(45) Date of Patent: Aug. 24, 2010

(54) LOW STRESS PACKAGE

(75) Inventor: Joseph Edward Riska, Macungie, PA (US)

(73) Assignee: Infinera Corporation, Sunnyvale, CA (US)

(*) Notice: Subject to any disclaimer, the term of this patent is extended or adjusted under 35 U.S.C. 154(b) by 0 days.

(21) Appl. No.: 12/344,127

(22) Filed: Dec. 24, 2008

(65) Prior Publication Data
US 2010/0158436 A1 Jun. 24, 2010

(51) Int. Cl.
G02B 6/12 (2006.01)
G02B 6/42 (2006.01)
G02B 6/30 (2006.01)
G02B 6/38 (2006.01)
G02B 6/36 (2006.01)
G02B 6/10 (2006.01)
H01L 23/52 (2006.01)

(52) U.S. Cl. ............................. 385/14; 385/15; 385/39; 385/49; 385/52; 385/63; 385/88; 385/89; 385/92; 385/93; 385/94; 385/129; 385/130; 385/131; 385/132; 257/736; 257/739; 257/777; 257/778; 257/779; 257/782; 257/783

(58) Field of Classification Search ................... 385/14, 385/15, 39, 49, 52, 63, 88, 89, 92–94, 129–132; 257/736, 739, 777–779, 782, 783
See application file for complete search history.

(56) References Cited

U.S. PATENT DOCUMENTS

| | | | |
|---|---|---|---|
| 5,841,217 A * | 11/1998 | Kizaki et al. ................. 310/348 |
| 6,370,290 B1 * | 4/2002 | Ball et al. ...................... 385/14 |
| 2003/0134450 A1 * | 7/2003 | Lee .............................. 438/106 |

* cited by examiner

Primary Examiner—Charlie Peng
Assistant Examiner—Hung Lam
(74) Attorney, Agent, or Firm—David L. Soltz

(57) ABSTRACT

Consistent with the present disclosure, a package is provided in which the PLC substrate, for example, is bonded to the underlying carrier though a limited contact area. The rest of the substrate is detached from the carrier so that stresses are applied to a limited portion of the PLC substrate. The PLC itself, however, is provided over that portion of the substrate that is detached from the carrier, and thus experiences reduced stress. Accordingly, high modulus adhesives, as well as solders, may be used to bond the PLC substrate to the carrier, thereby resulting in a more robust mechanical structure.

20 Claims, 6 Drawing Sheets

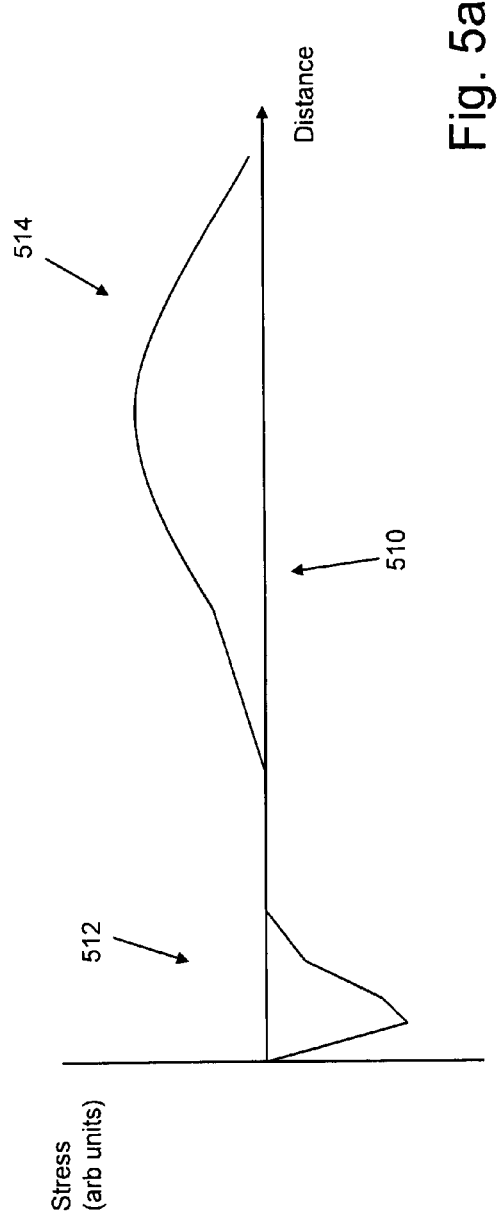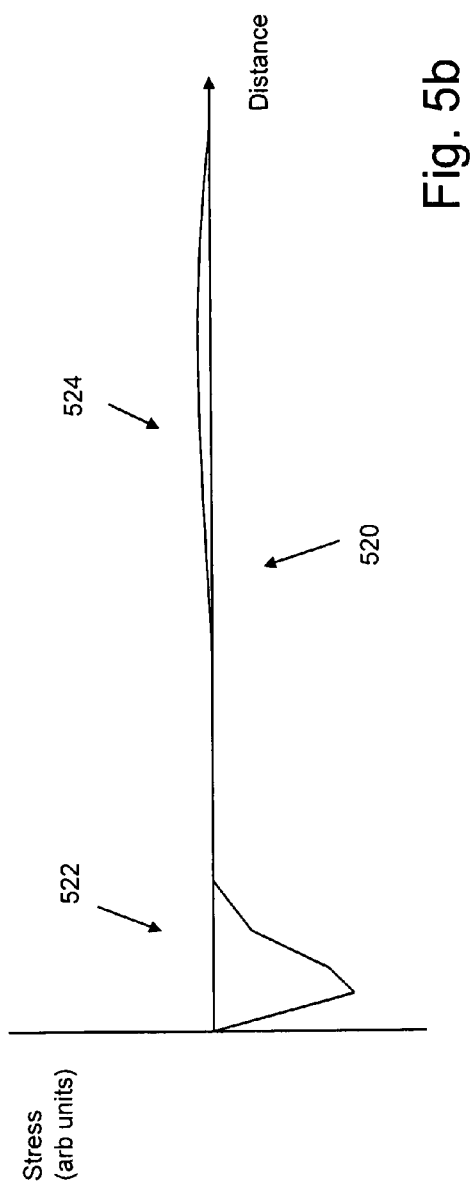

LOW STRESS PACKAGE

BACKGROUND

Optical components including, for example, planar lightwave circuits (PLCs) are known for multiplexing and demultiplexing optical signals. PLCs may also be used as filters, as well as wavelength tuners when coupled to appropriate lasers and control circuitry. PLCs typically include waveguides provided on the surface of a substrate, wherein the lengths of the waveguides are tailored to provide functionality at a particular wavelength or over a range of wavelengths.

The PLC substrate is provided in a package that is configured to control the temperature of the PLC itself. The package includes a carrier, upon which the PLC substrate is mounted. Typically, the entire underlying surface of the PLC substrate is bonded to the carrier with an adhesive having a relatively low modulus in order to lower any stress that may be applied to the PLC substrate that may result from changes in temperature and mechanical strains applied to the carrier. Nevertheless, some stress is applied to the PLC, thereby deforming the waveguides included therein, such that the PLC has additional loss, for example, at the desired wavelengths. Accordingly, performance of the PLC can be adversely affected.

Moreover, low modulus adhesives lack mechanical strength, resulting in weak, non-robust structures.

Accordingly, there is a need for a package suitable for use with a PLC that imparts relatively little stress to the PLC and is mechanically robust.

SUMMARY

Consistent with the present disclosure, a package is provided that includes a carrier having a surface, and a chip having a first surface and a second surface opposite the first surface. The second surface of the chip is defined by an edge that extends along a perimeter of the chip. An optical circuit is provided on the first surface of the chip, such that the second surface of the chip facing the surface of the carrier. The package also includes a bonding layer provided between a the chip and the carrier. The bonding layer has an edge that defines a portion of the second surface of the chip, wherein a remaining portion of the second surface of the chip extends from the edge of the bonding layer to the edge of the chip. The remaining portion of the second surface of the chip is detached from the carrier.

A manufacturing method is also provided that includes a step of providing a carrier having a surface. The method also includes the step of providing a chip having a first surface and a second surface opposite the first surface. The second surface is defined by an edge that extends along a perimeter of the chip, wherein an optical circuit is provided on the first surface of the chip. The method further includes attaching the carrier to the chip with a bonding layer, such that the second surface of the chip faces the surface of the carrier, and an edge of the bonding layer defines a portion of the second surface of the chip. A remaining portion of the second surface of the chip extends from the edge of the adhesive layer to the edge of the chip. The remaining portion of the second surface of the chip being is detached from the carrier.

It is to be understood that both the foregoing general description and the following detailed description are exemplary and explanatory only and are not restrictive of the invention, as claimed.

The accompanying drawings, which are incorporated in and constitute a part of this specification, illustrate various examples of the present disclosure.

BRIEF DESCRIPTION OF THE DRAWINGS

FIGS. 5a and 5b illustrate exemplary stress measurement plots associated with a conventional package (FIG. 5a) and a package consistent with the present disclosure (FIG. 5b).

DESCRIPTION OF THE EMBODIMENTS

Consistent with the present disclosure, a package is provided in which a substrate, having a PLC, for example, formed thereon, is bonded to the underyling carrier though a limited contact area. The rest of the substrate is detached from the carrier so that stresses are confined to a relatively small portion of the substrate. The PLC is provided over that portion of the substrate that is detached from the carrier, and, therefore, the PLC experiences reduced stress. Accordingly, high modulus adhesives, as well as solders, may be used to bond the PLC substrate to the carrier, thereby resulting in a more robust mechanical structure.

Reference will now be made in detail to the present exemplary embodiments, an examples of which are illustrated in the accompanying drawings. Wherever possible, the same reference numbers will be used throughout the drawings to refer to the same or like parts.

Figure 1:
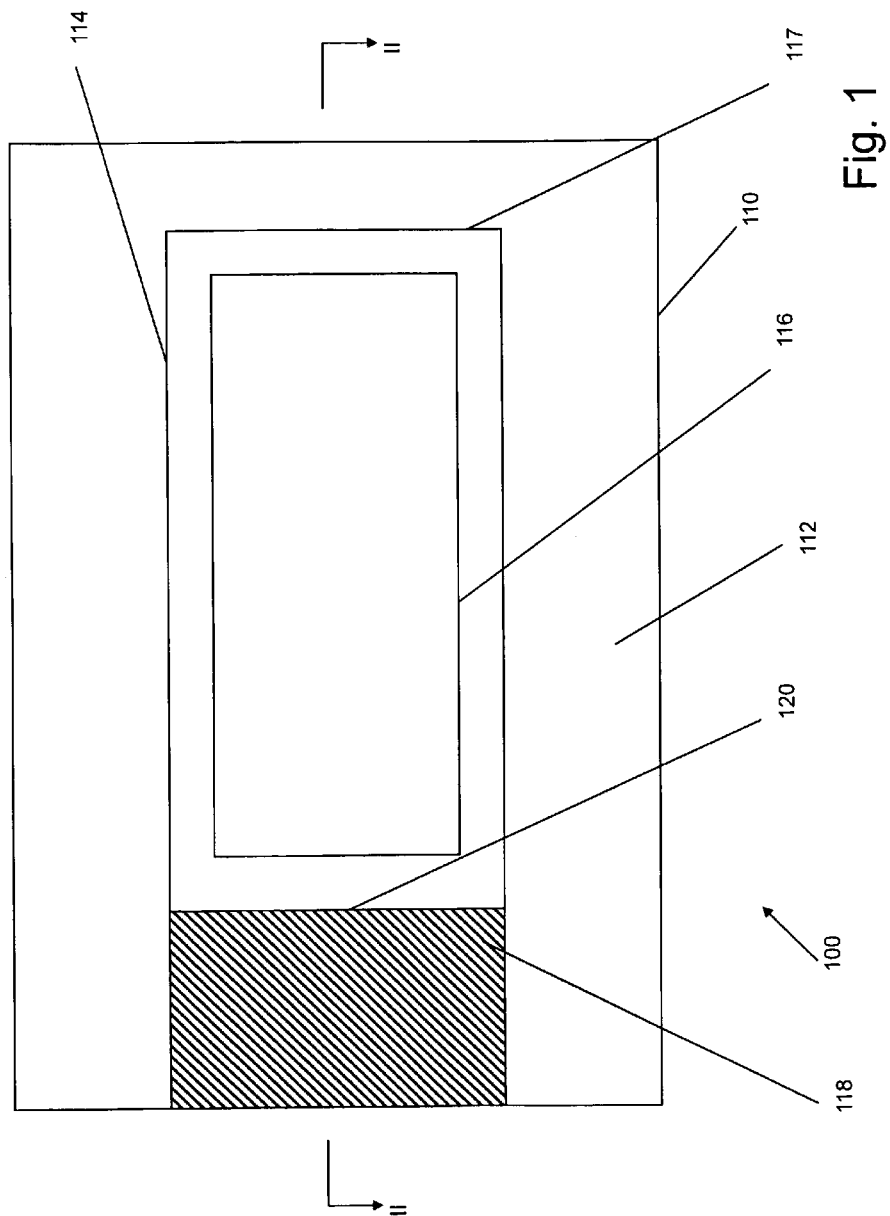
FIG. 1 is a plan view of a portion of package consistent with the present disclosure.

FIG. 1 illustrates a plan view of a portion of a package 100 consistent with the present disclosure. Package 100 includes a carrier 110 having a surface 112. A bonding layer 118, including for example, a solder or relatively high modulus adhesive, is provided on surface 112 of carrier 110. Bonding layer 118 has an edge 120. Chip 114, having edge 117, is attached to carrier 110 by bonding layer 118. Chip 114 may include a substrate made of silicon, for example. As further shown in FIG. 1, optical circuit 116 is provided on chip 114. Optical circuit 116 may include a photonic lightwave circuit (PLC), for example, and the PLC may include waveguides made of silicon dioxide or silicon nitride, for example, for appropriately directing or routing light through optical circuit 116.

Figure 2A:
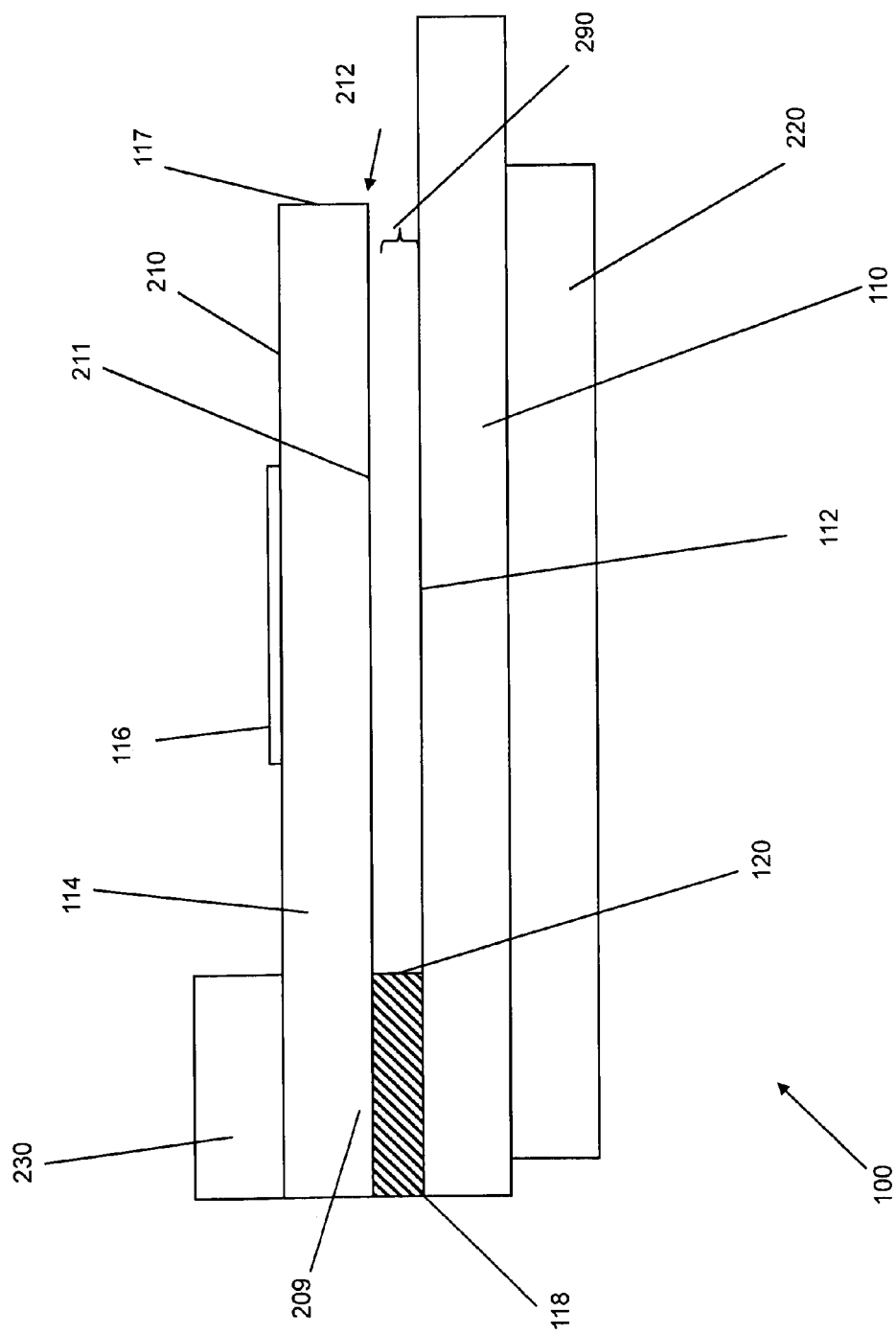
FIGS. 2a and 2b show cross-sectional and perspective views, respectively, of the package shown in FIG. 1.

As further shown in FIG. 2a, which is a cross-sectional view of package 100 taken along line II-II in FIG. 1, chip 116 is provided on a first surface 210 of chip 114. First surface 210 is opposite second surface 212 of chip 114. Edge 120 of bonding layer 118 defines a first portion 209 of second surface 212, as well as a second or remaining portion 211 of second surface 212 that extends from bonding layer edge 120 to chip edge 117. Thus, remaining portion 211 of second surface 212 of chip 114 is bounded by chip edge 117 and bonding layer edge 120. As shown in FIG. 2, remaining portion 211 is detached from carrier 110 and spaced from portion 209, such that carrier 110 and remaining portion 211 define a gap 290.

As a result, thermal and mechanical stress placed on carrier 110 are confined to that part of chip 114 adjacent portion 209, which is attached directly to bonding layer 118. Optical circuit 116, however, overlies the remaining portion 211 of second surface 212 of chip 114, which, as noted above, is detached from carrier 110. Optical circuit 116, therefore, remains relatively stress free.

As further shown in FIG. 2a, package 100 may optionally include a plate 220, which is configured to be attached a known thermo-electric cooler (TEC, discussed in greater detail below with reference to FIG. 2b) in order to adjust a temperature of optical circuit 116. In addition, a lid (a portion of which is labeled 230 in FIG. 2) may be provided to seal and protect and optical circuit 116. Lid portion 230 may overly a portion of the first portion 210 of chip 114.

Lid portion 230 may include a glass, for example, such as Pyrex®, and carrier 110 is preferably made of a material having similar thermal properties (e.g., coefficients of expansion) as chip 114. Alternatively, carrier 110 may be made of the same material as chip 114. Accordingly, for example, if chip 114 is made of silicon, as noted above, carrier 110 may also include silicon or may include a ceramic, such as aluminum nitride (AlN). Lastly, plate 220 may include an appropriate thermally conductive material, such as beryllium oxide (BeO).

Bonding layer 118 may include an adhesive, which may also be used to attach carrier 110 to plate 220. Alternatively, the adhesive may be replaced with a solder, such as a 63/37 lead-tin (Sn—Pb) solder having a melting or softening temperature of 183 degrees C. Other solders having melting points up to, for example 280 degrees C. may also be used, such as an 80/20 gold-tin (Au—Sn) solder. Both the adhesive and the solder may have a relatively high modulus. Excessively high temperatures should be avoided in applying either the adhesive or the solder in order to avoid damage to PLC 116 and/or chip 114.

Figure 2B:
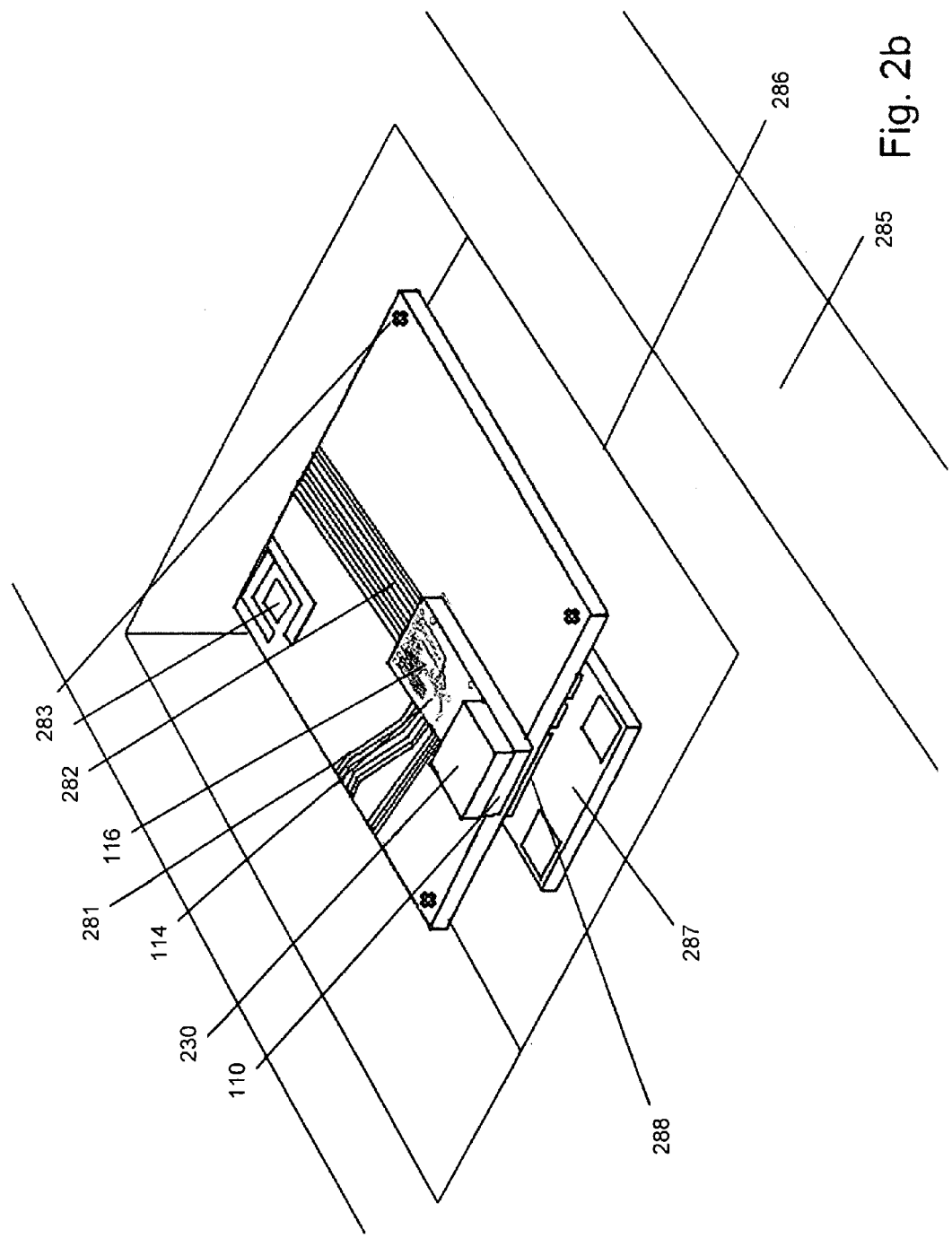

FIG. 2b illustrates a perspective view of package 100 provided in a window 286 of housing 205. As further shown in FIG. 2b, carrier 110 and plate 220 (not shown in FIG. 2b) are provided on thermo-electric cooler (TEC) 287. Preferably, a plurality of pillars 288 connect or thermally couple carrier 110 and plate 220 to TEC 287.

Optionally, conductive traces 281 and 282 may be provided on chip 114 to thereby provide appropriate electrical connections to PLC 114. In addition, alignment markings 283 may be provided on chip 114 in order to align to assist in fabrication of package 100.

Figure 3:
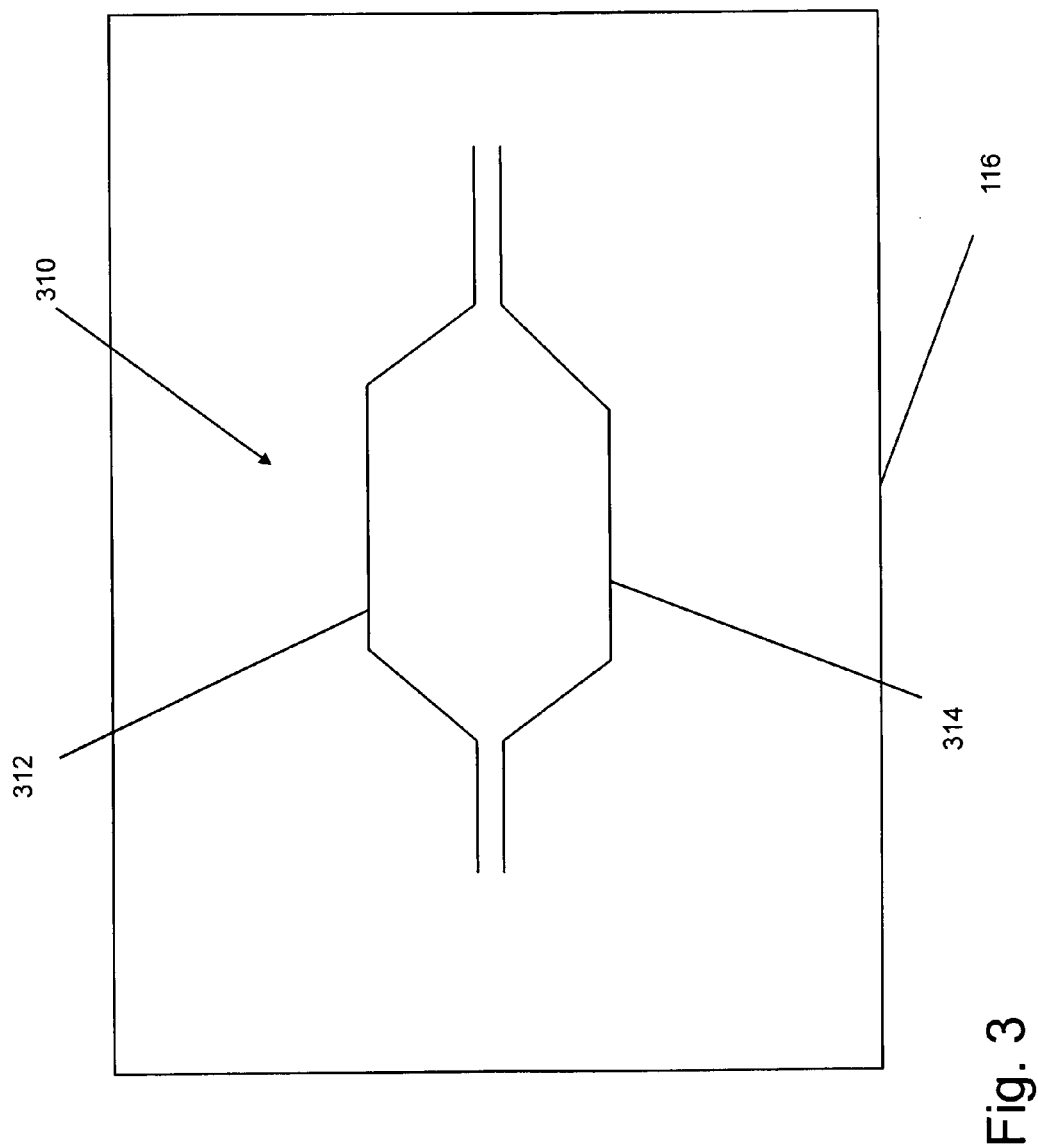
FIG. 3 is a plan view of a portion of an optical circuit consistent with an additional aspect of the present disclosure.

FIG. 3 illustrates a portion of an optical circuit 116 consistent with a further aspect of the present disclosure. Namely, FIG. 3 shows a Mach-Zehnder interferometer which may be included in optical circuit 116, although it is understood that other optical components may be included in optical circuit 116 in addition to or instead of Mach-Zehnder interferometer 310. As generally understood, Mach-Zehnder interferometer includes branches or waveguides 312 and 314, the refractive indices of which may be changed in order to adjust the phase passing through the interferometer. Since Mach-Zehnder interferometer 310 is less susceptible to stress, the lengths of waveguides 312 and 314 may be more precisely maintained, resulting in improved performance.

Figure 4:
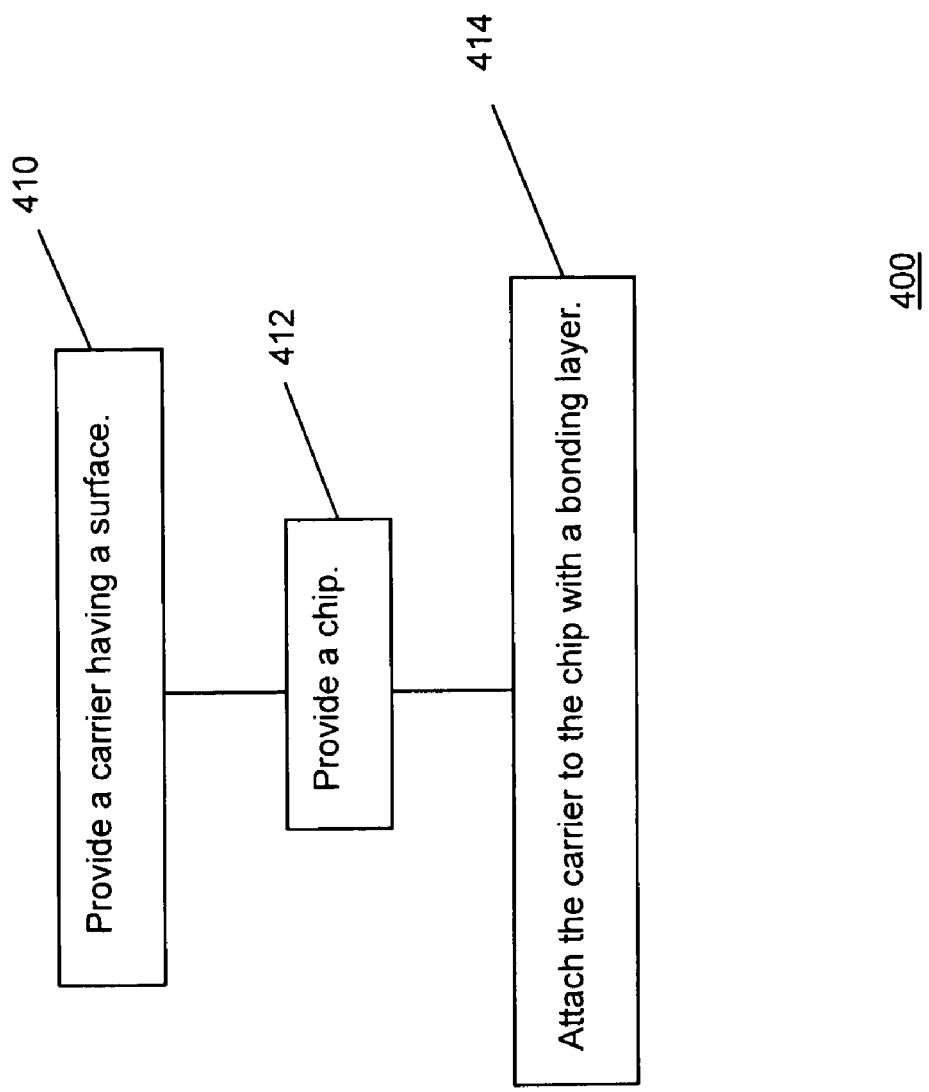
FIG. 4 illustrates a flow chart in connection with a method consistent with the present disclosure.

A manufacturing method consistent with an additional aspect of the present disclosure will next be described in connection with flowchart 400 shown in FIG. 4. In a first step (410), carrier 110 is provided that has a surface 112. In a second step (412), chip 114 is provided that has a first surface 210 opposite second surface 212. Carrier 110 and chip 114 are then attached to one another with a bonding layer 118, such that second surface 212 of the chip faces surface 112 of carrier 110 (step 414). In addition, a remaining portion 211 of the second surface 212 extends from the edge 120 of bonding layer 118 to the edge 117 of chip 114. In addition, as discussed above, chip 114 is bonded or attached to carrier 110 in a manner such that remaining portion 211 of the second surface 212 of chip 114 is detached from carrier 110.

FIGS. 5a and 5b illustrate stress measurement plots (514 and 524) associated with a conventional package and a package consistent with the present disclosure, respectively. In FIG. 5a, stress on the chip is measured in arbitrary units at various locations from an edge of the chip. Here, the bottom surface of the chip is bonded in its entirety to the carrier. As a result, significant stress is observed at various distances (e.g., portions 512 and 514 of plot 510) from the edge of the chip.

FIG. 5b shows a stress measurement plot 524 in connection with a package consistent with the present disclosure. Although stress is observed near the bonding layer (region 522 of plot 524), little stress is measured at locations spaced from the bonding layer (e.g., portion 524). Preferably, the optical circuit described above is provided in such low stress regions of the chip.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A package, comprising:
   a carrier having a surface;
   a chip having a first surface and a second surface opposite the first surface, the second surface being defined by an edge that extends along a perimeter of the chip;
   an optical circuit provided on the first surface of the chip, the second surface of the chip facing the surface of the carrier; and
   a bonding layer provided between the chip and the carrier, the bonding layer having a periphery that defines a portion of the second surface of the chip, a remaining portion of the second surface of the chip extending from the periphery of the bonding layer to the edge of the chip, the remaining portion of the second surface of the chip being detached from the carrier.

2. A package in accordance with claim 1, wherein the optical circuit overlies part of the remaining portion of the second surface of the chip.

3. A package in accordance with claim 1, wherein the optical circuit includes a Mach-Zehnder interferometer.

4. A package in accordance with claim 1, wherein the remaining portion of the second surface of the chip and the surface of the carrier define a gap.

5. A package in accordance with claim 1, further including a plate, the plate being configured to adjust a temperature of the optical circuit.

6. A package in accordance with claim 1, further including:
   a lid, a portion of the lid overlies the portion of the second surface of the chip.

7. A package in accordance with claim 1, wherein the bonding layer includes a solder.

8. A package in accordance with claim 1, wherein the bonding layer includes an adhesive.

9. A package in accordance with claim 1, wherein the optical circuit is a planar lightwave circuit (PLC).

10. A package in accordance with claim 1, wherein the chip includes a substrate, the substrate including silicon.

11. A manufacturing method, comprising:
    providing a carrier having a surface;
    providing a chip having a first surface and a second surface opposite the first surface, the second surface being defined by an edge that extends along a perimeter of the chip, an optical circuit being provided on the first surface of the chip; and attaching the carrier to the chip with a bonding layer, such that the second surface of the chip faces the surface of the carrier, and a periphery of the bonding layer defines a portion of the second surface of the chip, a remaining portion of the second surface of the chip extending from the periphery of the bonding layer to the edge of the chip, the remaining portion of the second surface of the chip being detached from the carrier.

12. A manufacturing method in accordance with claim 11, wherein the optical circuit overlies part of the remaining portion of the second surface of the chip.

13. A manufacturing method in accordance with claim 11, wherein the optical circuit includes a Mach-Zehnder interferometer.

14. A manufacturing method in accordance with claim 11, wherein the remaining portion of the second surface of the chip and the surface of the carrier define a gap.

15. A manufacturing method in accordance with claim 11, further including providing a plate that is configured to adjust a temperature of the optical circuit.

16. A manufacturing method in accordance with claim 11, further including providing a lid, such that a portion of the lid overlies the portion of the second surface of the chip.

17. A manufacturing method in accordance with claim 11, wherein the bonding layer includes a solder.

18. A manufacturing method in accordance with claim 11, wherein the bonding layer includes an adhesive.

19. A manufacturing method in accordance with claim 11, wherein the optical circuit is a planar lightwave circuit (PLC).

20. A manufacturing method in accordance with claim 11, wherein the chip includes a substrate, the substrate including silicon.

* * * * *